US012757056B2

(12) United States Patent
Cui et al.

(10) Patent No.: US 12,757,056 B2
(45) Date of Patent: Oct. 6, 2026

(54) INTER RADIO ACCESS TECHNOLOGY MEASUREMENT WITHOUT MEASUREMENT GAP

(71) Applicant: Apple Inc., Cupertino, CA (US)

(72) Inventors: Jie Cui, San Jose, CA (US); Yang Tang, San Jose, CA (US); Qiming Li, Beijing (CN); Manasa Raghavan, Sunnyvale, CA (US); Xiang Chen, Campbell, CA (US); Huaning Niu, San Jose, CA (US); Dawei Zhang, Saratoga, CA (US); Hong He, Cupertino, CA (US); Yushu Zhang, Beijing (CN); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 18/726,402

(22) PCT Filed: Jan. 6, 2022

(86) PCT No.: PCT/CN2022/070471
§ 371 (c)(1),
(2) Date: Jul. 2, 2024

(87) PCT Pub. No.: WO2023/130307
PCT Pub. Date: Jul. 13, 2023

(65) Prior Publication Data
US 2025/0071589 A1 Feb. 27, 2025

(51) Int. Cl.
*H04W 24/10* (2009.01)
*H04W 74/0808* (2024.01)
*H04W 74/08* (2024.01)

(52) U.S. Cl.
CPC ....... *H04W 24/10* (2013.01); *H04W 74/0808* (2013.01)

(58) Field of Classification Search
CPC ............. H04W 24/10; H04W 74/0808; H04W 36/00222; H04W 36/0088; H04W 8/24; H04W 88/06
See application file for complete search history.

(56) References Cited

U.S. PATENT DOCUMENTS

| | | | | |
|---|---|---|---|---|
| 9,894,547 B2 | 2/2018 | Das | | |
| 2013/0308481 A1* | 11/2013 | Kazmi | .................. | H04W 24/02 370/252 |

(Continued)

FOREIGN PATENT DOCUMENTS

| | | |
|---|---|---|
| CN | 112543443 | 3/2021 |
| JP | 2014-504055 | 2/2014 |

(Continued)

OTHER PUBLICATIONS

Office Action for JP 2024-539964; May 29, 2025.

(Continued)

*Primary Examiner* — Andrew Lee
(74) *Attorney, Agent, or Firm* — Kowert, Hood, Munyon, Rankin & Goetzel, P.C.

(57) ABSTRACT

This disclosure relates to techniques for performing inter radio access technology measurements without a measurement gap in a wireless communication system. A wireless device and a cellular base station may establish a wireless link according to a first radio access technology. The cellular base station may indicate to the wireless device to perform inter radio access technology measurements. The wireless device may determine that it is capable of performing the inter radio access technology measurements without a measurement gap. The wireless device may provide capability information to the cellular base station indicating that the wireless device is capable of performing the inter radio access technology measurements without a measurement (Continued)

gap. The wireless device may perform the inter radio access technology measurements without a measurement gap.

20 Claims, 4 Drawing Sheets

(56) References Cited

U.S. PATENT DOCUMENTS

| | | | | |
|---|---|---|---|---|
| 2016/0044553 | A1* | 2/2016 | Dalsgaard | H04W 36/0085 370/332 |
| 2019/0141696 | A1* | 5/2019 | Kim | H04L 5/0055 |
| 2019/0305912 | A1* | 10/2019 | Kazmi | H04W 72/0453 |
| 2021/0368374 | A1 | 11/2021 | Cheng | |
| 2021/0410024 | A1* | 12/2021 | Tang | H04W 36/0088 |
| 2022/0174529 | A1* | 6/2022 | Takada | H04W 76/15 |
| 2022/0217562 | A1* | 7/2022 | Tang | H04W 24/10 |
| 2023/0088518 | A1* | 3/2023 | Hu | H04B 17/309 370/252 |
| 2023/0345286 | A1* | 10/2023 | Zhang | H04W 24/10 |
| 2025/0183971 | A1* | 6/2025 | Da Silva | H04B 7/0632 |

FOREIGN PATENT DOCUMENTS

| | | |
|---|---|---|
| JP | 2017-515396 | 6/2017 |
| WO | 2019092943 | 5/2019 |
| WO | 2019215901 | 11/2019 |
| WO | 2020202396 | 10/2020 |
| WO | 2021027787 | 2/2021 |

OTHER PUBLICATIONS

CATT "Motivation on Further RRM enhancement for NR and MR-DC in Rel-18" 3GPP TSG RAN Meeting #94e RP-213300; Dec. 6, 2021.

Mediatek Inc "Discussion on measurement requirements for NR-U" 3GPP TSG-RAN WG4 Meeting $98-e R4-2100770; Jan. 25, 2021.

Mediatek Inc "Report of [107#81][NR TEI16] Need-for-Gaps signaling" 3GPP TSG RAN WG2 Meeting #108 R2-1914914; Nov. 18, 2019.

International Search Report for PCT Application No. PCT/CN2022/070471; Apr. 26, 2022.

Intel Corp "Discussion on gapless feature for inter-frequency measurement"; 3GPP TSG-RAN WG2 Meeting #110 R2-2004726; Jun. 12, 2020.

RAN2 "LS on NeedForGap capability"; 3GPP TSG RAN WG4 Meeting #95-e TDoc R4-2008287; Jun. 5, 2020.

CMCC et al. "Introduction of inter-frequency measurement without gap"; 3GPP TSG-RAN WG2 Meeting #110-e R2-2005446; Jun. 12, 2020.

Extended European Search Report for EP 229177837; Sep. 11, 2025.

CATT "Discussion on RRM requirements for Inter-RAT measurement without gap" 3GPP TSG RAN4 Meeting #106bis-e R4-2304419; Apr. 17, 2023.

Apple Inc. "Discussion on R18 inter-RAT measurement without gap" 3GPP TSG RAN WG4 Meeting #110 R4-2400380; Feb. 26, 2024.

* cited by examiner

INTER RADIO ACCESS TECHNOLOGY MEASUREMENT WITHOUT MEASUREMENT GAP

PRIORITY INFORMATION

This application is a national phase entry of PCT application number PCT/CN2022/070471, entitled "Inter Radio Access Technology Measurement without Measurement Gap," filed Jan. 6, 2022, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for performing inter radio access technology measurements without a measurement gap in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™ etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for performing inter radio access technology measurements without a measurement gap in a wireless communication system.

The techniques described herein include signaling mechanisms for a wireless device and a cellular base station to coordinate whether the wireless device performs inter-RAT measurements without a measurement gap. The techniques can include scenarios in which a serving cell operates according to LTE and an NR measurement is configured, as well as scenarios in which a serving cell operates according to NR and an LTE measurement is configured, among various possibilities.

According to the techniques described herein, it may be possible for a wireless device to determine and indicate its capability to perform inter-RAT measurements without a measurement gap for measurements that are contained within the current active bandwidth part for the wireless device and/or for measurements that are not contained within the current active bandwidth part for the wireless device. The cellular base station may correspondingly be able to determine whether to configure those measurements with or without a measurement gap. Thus, it may be possible for at least some inter-RAT measurements to be performed without measurement gaps, which may potentially reduce communication interruptions, increase spectral efficiency, increase data throughput, and/or provide any of various other benefits to the cellular network and/or the wireless device implementing the techniques described herein, at least according to some embodiments.

Note that techniques for handling carrier specific scaling factor determination in view of the possibility of such inter-RAT measurements being performed without a measurement gap are also described herein. Additionally, techniques for handling scenarios in which a wireless device does not support mixed numerology but is otherwise capable of performing an inter-RAT measurement with different subcarrier spacing than the serving cell without a measurement gap are described herein.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
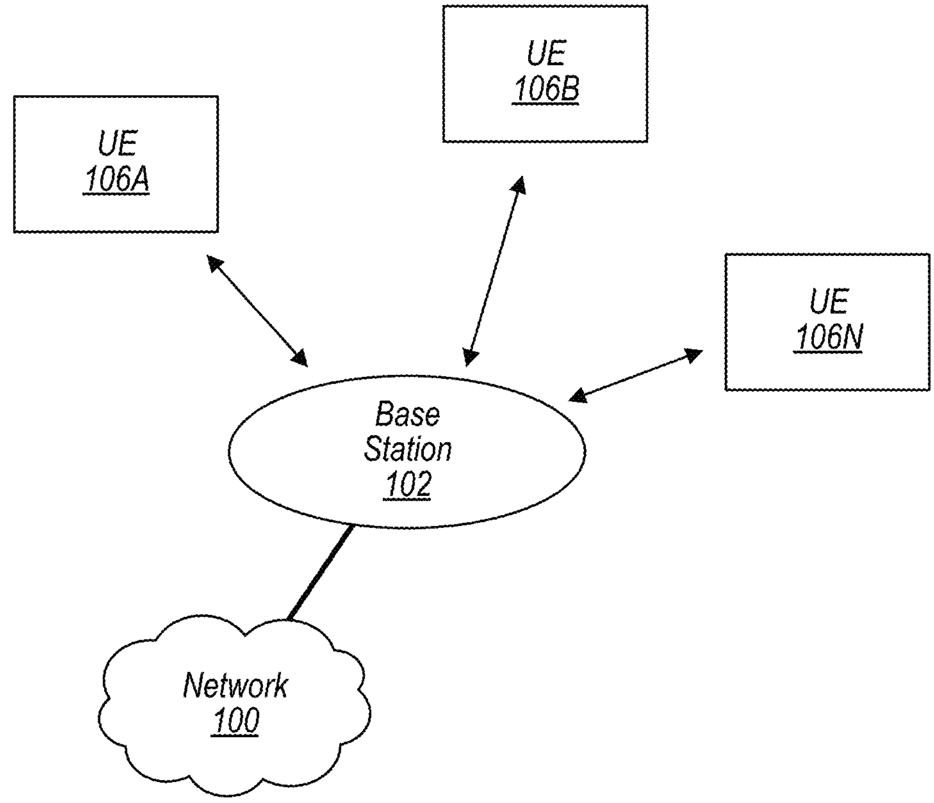
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set.
QCL: Quasi-Co-Located or Quasi-Co-Location
CSI: Channel State Information
CSI-RS: Channel State Information Reference Signals
CSI-IM: Channel State Information Interference Management.
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator
CSSF: Carrier-Specific Scaling Factor

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically-refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
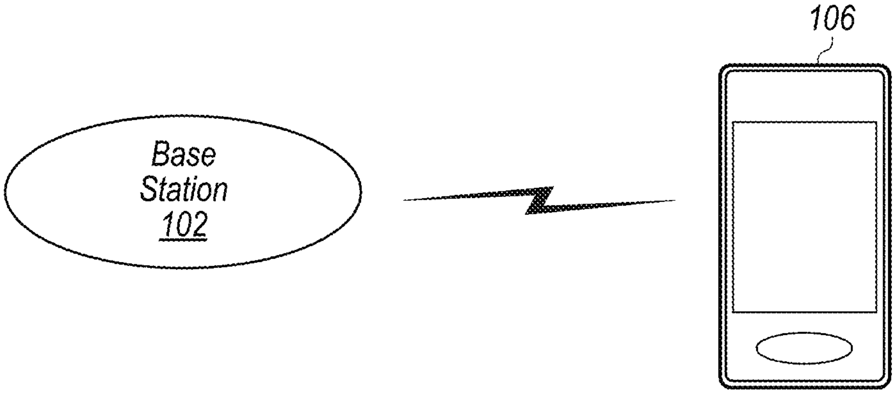
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using cither or both of a 3GPP cellular communication standard or a 3GPP2 cellular communication standard. In some embodiments, the UE 106 may be configured to perform inter radio access technology measurements without a measurement gap in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
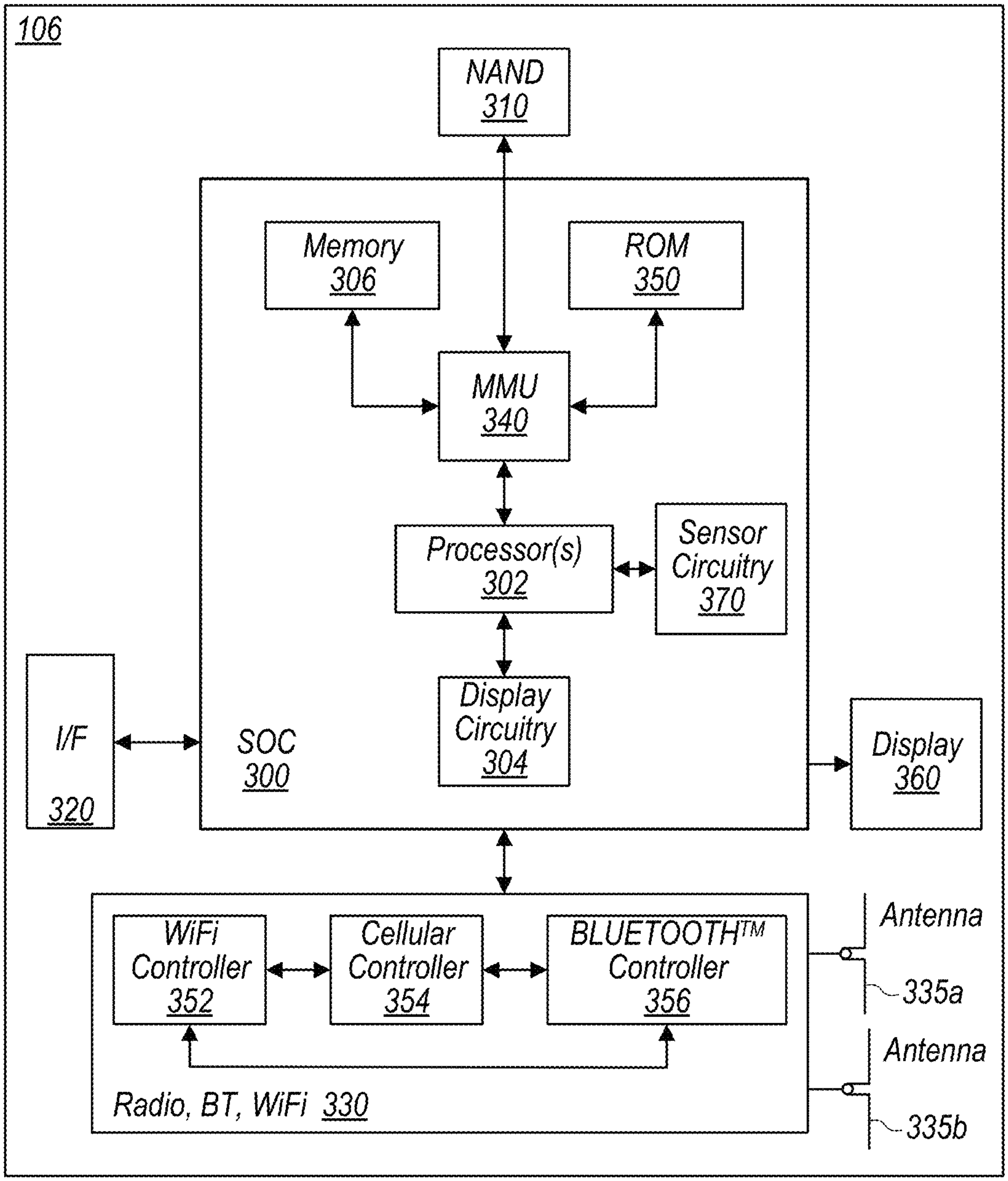
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform inter radio access technology measurements without a measurement gap in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform inter radio access technology measurements without a measurement gap in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
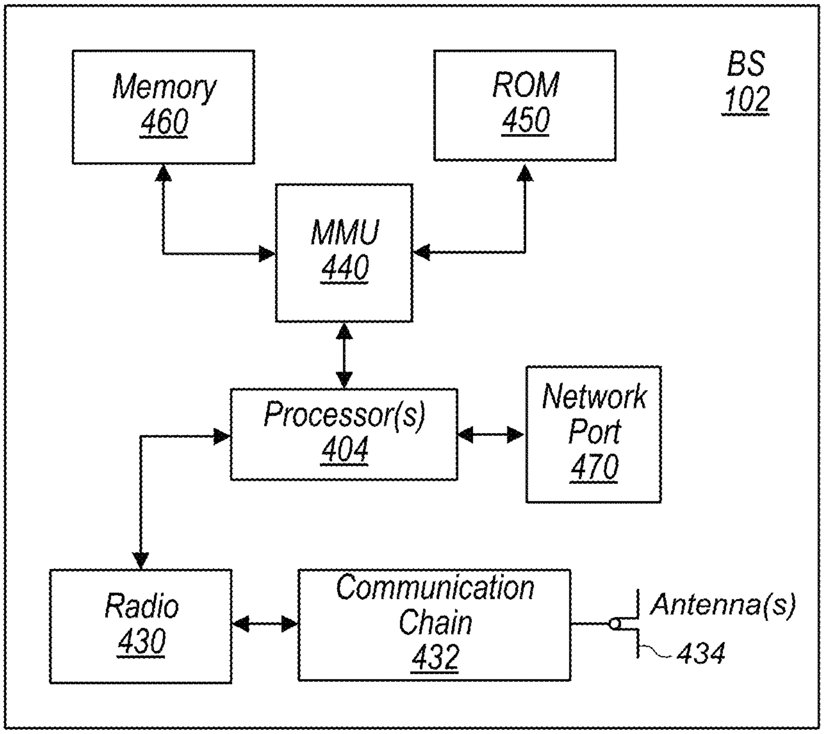
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
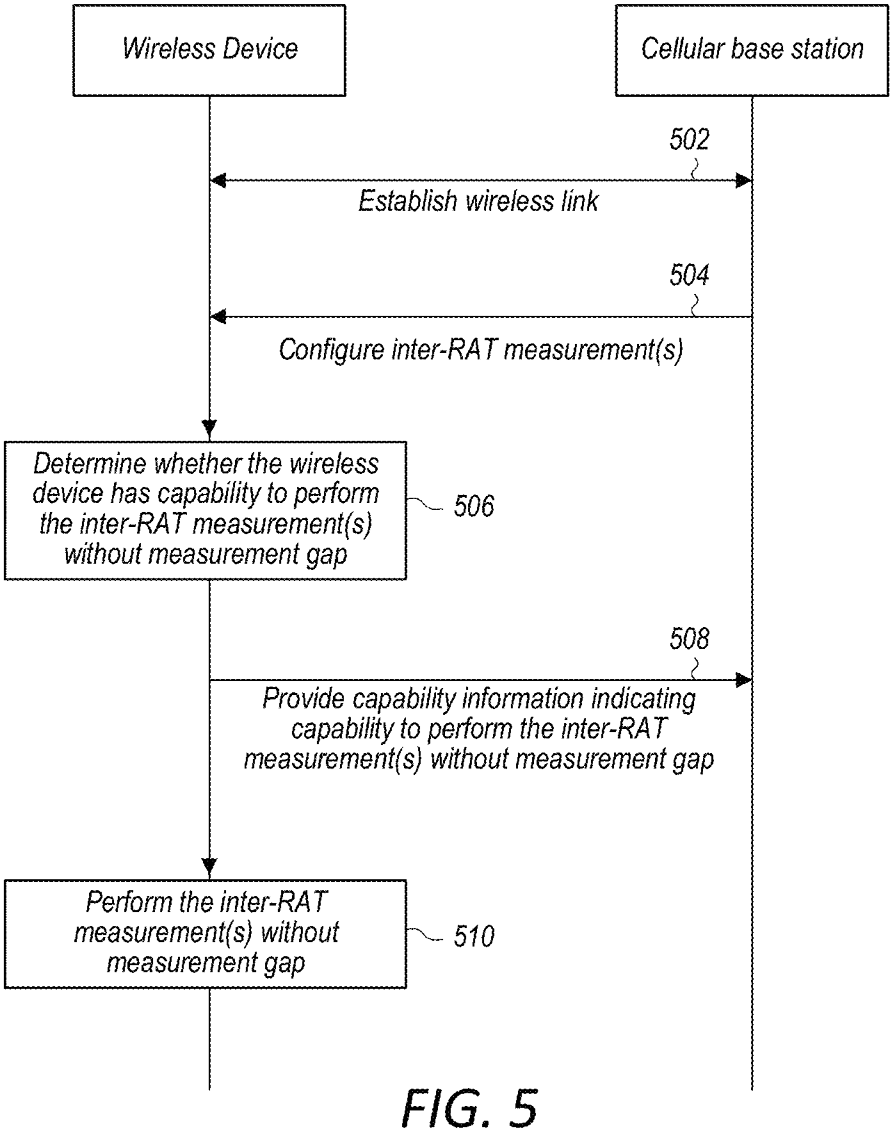
FIG. 5 is a communication flow diagram illustrating aspects of an exemplary possible method for performing inter radio access technology measurements without a measurement gap in a wireless communication system, according to some embodiments.

FIG. 5—Inter Radio Access Technology Measurement Without Measurement Gap

Cellular communication technologies can provide support for a wireless device to perform measurements on other cells that operate according to different radio access technologies. However, such inter radio access technology or "inter-RAT" measurements generally always require the use of a "measurement gap", a period of time in which the wireless device's communication with the serving cell is suspended to allow the wireless device to perform neighbor cell measurements, at least according to current 3GPP standard specifications.

As wireless device capabilities increase, including potentially supporting device designs that can include multiple transmit and/or receive chains, it may be possible that a wireless device could be capable of performing inter-RAT measurements without use of a measurement gap, for example by using one communication chain to perform the inter-RAT measurements and another communication chain to communicate with the serving cell, least in some circumstances. However, it may be important to provide clear signaling mechanisms between a wireless device and a serving cell to support such capabilities, for example in order for the cell to know when measurement gaps are needed and when measurement gaps are not needed for a wireless device and to configure (or not configure) measurement gaps for the wireless device accordingly.

Thus, it may be beneficial to specify techniques for supporting performing inter-RAT measurements without a measurement gap, at least according to some embodiments. To illustrate one such set of possible techniques, FIG. 5 is a flowchart diagram illustrating a method for performing inter-RAT measurements without a measurement gap in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP, LTE, and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities. In some instances, capability information for the wireless device may additionally or alternatively be provided after the wireless link has been established.

In 504, the cellular base station may configure the wireless device to perform one or more inter-RAT measurements, which may include at least a “first” inter-RAT measurement. For example, the wireless link may operate according to LTE, and the first measurement may be for a NR carrier frequency, or the wireless link may operate according to NR, and the first measurement may be for a LTE carrier frequency. The cellular base station may configure the inter-RAT measurement(s) by providing a measurement object (MO) to the wireless device, e.g., to indicate which measurements to perform, at least in some instances.

Note that, at least according to some embodiments, the target frequency of the first inter-RAT measurement may be a non-serving cell frequency (e.g., may not be associated with the same cellular base station currently serving the wireless device, as could potentially be the case if the cellular base station is a multi-mode cellular base station capable of providing both NR and LTE cells).

In 506, the wireless device may determine whether it has the capability to perform any or all of the inter-RAT measurement(s) without a measurement gap. Determining whether the wireless device is capable of performing an inter-RAT measurement without a measurement gap may be based on any of a variety of considerations, according to various embodiments. As one possible consideration, the wireless device may determine whether it has the capability to perform each configured inter-RAT measurement without a measurement gap based at least in part on whether the measurement frequency is contained within the current active bandwidth part (BWP) for the wireless device. For example, in some instances, a wireless device may be capable of performing inter-RAT measurements whose measurement frequencies are contained within the current active BWP for the wireless device without a measurement gap but not capable of performing inter-RAT measurements whose measurement frequencies are not contained within the current active BWP for the wireless device without a measurement gap. It may also be possible that a wireless device is capable of performing inter-RAT measurements whose measurement frequencies are not contained within the current active BWP for the wireless device without a measurement gap but not capable of performing inter-RAT measurements whose measurement frequencies are contained within the current active BWP for the wireless device without a measurement gap, or for a wireless device to be capable of performing inter-RAT measurements without a measurement gap regardless of whether the measurement frequencies are contained within the current active BWP for the wireless device. In some instances, the number of inter-RAT measurements whose measurement frequencies are not contained within the current active BWP for the wireless device that can be performed (or possibly the number of bands on which such inter-RAT measurements can be performed) without a measurement gap may be limited by the hardware capabilities (e.g., number of communication chains) of the wireless device.

In some embodiments, the measurement frequency for each configured inter-RAT measurement may depend on the type of measurement or otherwise on the measurement parameters. For example, the center measurement bandwidth of a LTE measurement for which wideband reference signal received quality (RSRQ) is not configured may be determined differently (e.g., as 1.4 MHz or 6 LTE physical resource blocks (PRBs)) than an LTE measurement for which wideband RSRQ is configured (e.g., as configured using an allowedMeasBandwidth parameter such as defined in 3GPP TS 36.331 v.16.6.0). For a NR measurement, the center measurement bandwidth may be determined as the SSB bandwidth or L3 CSI-RS measurement bandwidth, at least according to some embodiments. Which reference signals are used for such measurement may be configured by the network for mobility purposes.

At least according to some embodiments, the wireless device may determine that it is capable of performing at least the first inter-RAT measurement without a measurement gap. In some instances, the wireless device may determine that it is capable of performing multiple configured inter-RAT measurements without a measurement gap.

In 508, the wireless device may provide capability information indicating whether the wireless device is capable of performing the inter-RAT measurements without a measurement gap. The capability information may include information indicating whether the wireless device is capable of performing inter-RAT measurements that are within a current active bandwidth part without a measurement gap, as one possibility. Additionally, or alternatively, the capability information may include information indicating whether the wireless device is capable of performing inter-RAT measurements that are outside of a current active bandwidth part without a measurement gap. As a still further possibility, the capability information may include information indicating whether the wireless device is capable of performing inter-RAT measurements without a measurement gap regardless of whether they are within or outside of a current active bandwidth part. In some instances, the capability information may indicate, for each respective inter-RAT measurement indicated by the cellular base station, whether the wireless device can perform the respective inter-RAT measurement without a measurement gap.

Note that the capability information for the wireless device may be provided during an initial configuration, or in response to configuration of a measurement object including one or more inter-RAT measurements, among various possibilities. For example, in some instances, if the wireless device is capable of performing inter-RAT measurements that are within a current active bandwidth part without a measurement gap, it may be possible for the wireless device to indicate such capability during initial configuration. The cellular base station may respond to such a capability indication by providing a flag indication from the network to the wireless device to indicate whether to perform inter-RAT measurements that are within a current active bandwidth part without a measurement gap, at least according to some embodiments. Thus, the wireless device may be configured to generally perform inter-RAT measurements that are within a current active bandwidth part without a measurement gap based on such a signaling design, potentially without further signaling to negotiate whether to use a measurement gap for such inter-RAT measurements. Additionally, or alternatively, it may be possible for the cellular network to update the wireless device (e.g., using RRC re-configuration signaling) with respect to whether to perform inter-RAT measurements that are within a current active bandwidth part without a measurement gap after initially configuring the wireless device in a different manner. For example, the cellular base station could provide a flag indication to indicate to perform inter-RAT measurements that are within a current active bandwidth part without a measurement gap after initially indicating to not inter-RAT measurements that are within a current active bandwidth part without a measurement gap, or vice versa.

As another example, in some instances, if the wireless device is capable of performing inter-RAT measurements that are outside of a current active bandwidth part without a measurement gap, but limited by device hardware capabilities with respect to on which and/or how many bands such inter-RAT measurements can be performed by the wireless device without a measurement gap, the wireless device may provide capability information indicating its capabilities with respect to performing inter-RAT measurements without a measurement gap in response to being configured to perform one or more inter-RAT measurements outside of the current active BWP for the wireless device. For example, in such a scenario, the wireless device may provide capability information indicating that the wireless device is generally capable of performing inter-RAT measurements that are outside of a current active bandwidth part without a measurement gap, and further indicating specifically, for each configured inter-RAT measurement, whether the wireless device is capable of performing the inter-RAT measurement without a measurement gap. At least in some instances, the cellular base station may determine whether to configure a measurement gap for some or all of the inter-RAT measurements configured in a measurement object based at least in part on such capability information received from the wireless device in response to the measurement object configuration.

Note that for a wireless device that only supports single carrier capability (e.g., with no carrier aggregation or dual connectivity capability), it may be the case that the inter-RAT measurements are always performed within a measurement gap, at least according to some embodiments.

In 510, the wireless device may perform inter-RAT measurement(s) without a measurement gap. The inter-RAT measurement(s) performed without a measurement gap may include any such measurements that the wireless device has determined that it is capable of performing without a measurement gap, that the wireless device has reported its capability to perform without a measurement gap to the cellular base station, and possibly that the cellular base station has indicated to the wireless device to perform without a measurement gap, according to some embodiments. For example, at least according to some embodiments, the wireless device may perform at least the first inter-RAT measurement without a measurement gap.

Note that when no measurement gap is used at the wireless device to perform an inter-RAT measurement, it may be the case that the wireless device determines a carrier specific scaling factor (CSSF) based at least in part on the inter-RAT measurement being performed without measurement gap. For example, when no measurement gap is used at the wireless device to perform an inter-RAT measurement, it may be the case that only NR carriers but not LTE carriers are counted for the CSSF, and that any LTE detection/measurement is performed outside of the NR synchronization signal block based measurement timing configuration (SMTC) measurement window for gapless NR measurement. In some instances, whether LTE carriers are counted for the CSSF may depend at least in part on the NR SMTC measurement window frequency. For example, when no measurement gap is used at the wireless device to perform an inter-RAT measurement, it may be the case that if the periodicity of NR SMTC measurement windows for gapless NR measurement is greater than a certain threshold, only NR carriers but not LTE carriers are counted for the CSSF, and that any LTE detection/measurement is performed outside of the NR SMTC measurement window for gapless NR measurement. If the periodicity of NR SMTC measurement windows for gapless NR measurement is equal to or smaller than the threshold, both NR carriers and LTE carriers may be counted for the CSSF, and any LTE detection/measurement may be performed either inside or outside of the NR SMTC measurement window for gapless NR measurement.

It may also be useful to provide techniques for handling scenarios in which the wireless link and a configured inter-RAT measurement are associated with different subcarrier spacing and the wireless device does not support mixed numerology. As one possible option for handling such a scenario, it may be the case that the cellular base station restricts scheduling communication on the wireless link with the wireless device during such an inter-RAT measurement, e.g., based at least in part on the wireless link with the wireless device and the inter-RAT measurement being associated with different subcarrier spacing and the wireless device not supporting mixed numerology. As another possible option for handling such a scenario, it may be the case that the wireless device disables or interrupts communication on the wireless link with the cellular base station during such an inter-RAT measurement, e.g., based at least in part on the wireless link with the cellular base station and the inter-RAT measurement being associated with different subcarrier spacing and the wireless device not supporting mixed numerology. Otherwise, if the wireless device can support mixed numerology, it may be the case that no such scheduling restriction or communication interruption is applied by either the cellular base station or the wireless device, at least according to some embodiments.

Thus, at least according to some embodiments, the method of FIG. 5 may be used to provide a framework according to which a wireless device can perform inter radio access technology measurements without a measurement gap, and thus potentially be able to continue communicating with a serving cell in an uninterrupted manner while performing the inter radio access technology measurements, at least in some instances.

Additional Information

The following additional information describes further aspects that might be used in conjunction with the method of FIG. 5 if desired. It should be noted, however, that the exemplary details described in the following section are not intended to be limiting to the disclosure as a whole: numerous variations and alternatives to the details provided herein below are possible and should be considered within the scope of the disclosure.

Currently, inter-RAT measurements in 3GPP cellular communication technologies are always associated with measurement gaps, for example as specified in TS 38.133 v.17.3.0 section 9.4.2. However, there may be some scenarios in which it may be possible for inter-RAT measurements to be performed without use of a measurement gap, at least in some instances. Accordingly, it may be useful to provide techniques for identifying when such a scenario is occurring, and to provide signaling mechanisms for communicating capabilities and configuration information between a wireless device and a cellular network to support potential inter-RAT measurements without a measurement gap.

Some possible scenarios in which a wireless device may be capable of performing inter-RAT measurements without a measurement gap can occur when an NR cell configures a UE to perform an inter-RAT measurement on a target non-serving LTE frequency carrier. In some scenarios, the center measurement bandwidth of the target LTE frequency carrier may be within the current active bandwidth part (BWP) for the UE, while in other scenarios, the center measurement bandwidth of the target LTE frequency carrier may not fully be contained within the current active BWP for the UE.

Scenarios are also possible in which a wireless device may be capable of performing inter-RAT measurements without a measurement gap when an LTE cell configures a UE to perform an inter-RAT measurement on a target non-serving NR frequency carrier. In some scenarios, the center measurement bandwidth of the target NR frequency carrier may be within the current active BWP for the UE, while in other scenarios, the center measurement bandwidth of the target NR frequency carrier may not fully be contained within the current active BWP for the UE.

To provide support for performing inter-RAT measurements without a measurement gap in such scenarios, new signaling design aspects may be introduced, potentially including signaling of capability information from the wireless device to the network (e.g., to indicate when the wireless device is capable of performing one or more inter-RAT measurements without a measurement gap) and/or signaling of flag information from the network to the wireless device (e.g., to indicate whether to perform those inter-RAT measurements without a measurement gap).

In some embodiments, certain UE behaviors associated with potentially performing inter-RAT measurements without a measurement gap may also be provided, which may relate to the behavior of a UE with single carrier capability (e.g., non-carrier aggregation/dual connectivity capable), carrier specific scaling factor (CSSF) for measurement period determination when a measurement gap is not used, and/or design considerations for scheduling restriction or communication interruption design when inter-RAT measurement without a measurement gap is used, among various possibilities.

Note that the CSSF may scale the measurement delay requirements e.g., as further described in 3GPP TS 38.133 v.17.3.0 sections 9.2, 9.2A, 9.3, 9.3A, 9.4, NR PRS based positioning measurements, e.g., as further described in 3GPP TS 38.133 v.17.3.0 section 9.9, and/or CSI-RS based L3 measurement, e.g., as further described in 3GPP TS 38.133 v.17.3.0 section 9.10, when a UE is configured to monitor multiple measurement objects.

Note that for determining whether the center measurement bandwidth for a target cell is within the current active BWP for a UE, in the case of a target LTE frequency carrier, if wideband RSRQ measurement is not configured, it may be the case that the minimum measurement bandwidth for PSS/SSS/CRS detection and measurement (e.g., 1.4 MHz or 6 LTE physical resource blocks (PRBs)) is used as the center measurement bandwidth. Otherwise, if wideband RSRQ measurement is configured for the target LTE frequency carrier, the measurement bandwidth configured for wideband RSRQ (e.g., allowedMeasBandwidth in 3GPP TS 36.331 v.16.6.0) may be used as the center measurement bandwidth. In the case of a target NR frequency carrier, the SSB bandwidth or L3 CSI-RS measurement bandwidth may be used, and which reference signal is used for such measurement may be configured by the network for mobility purpose.

In a scenario in which an NR serving cell configures a UE to perform inter-RAT measurement on a target non-serving LTE frequency carrier, and the center measurement bandwidth of the target LTE frequency is within the UE current active BWP, a new UE capability indication may be introduced, which may be referred to as "InterRATMeas-NoGap", "InterRATMeas-NoGap-E-UTRAN", or according to any of various other possible naming conventions. The UE capability indication may indicate whether the UE can perform inter-RAT LTE measurements without measurement gaps if the center measurement bandwidth of the target LTE frequency carrier is completely contained in the active BWP of the UE. A new flag indication from the network to the UE may also be introduced, which may be referred to as "InterRATConfig-NoGap", "InterRATConfig-NoGap-E-UTRAN", or according to any of various other possible naming conventions. If the field is set to true, the UE may be configured to perform inter-RAT LTE measurement without measurement gaps when the LTE center measurement bandwidth is completely contained in the active BWP of the UE. Otherwise, it may be the case that the inter-RAT LTE measurement is performed within measurement gaps.

Note that, at least according to some embodiments, if a UE only supports single carrier capability (e.g., the UE has no CA/DC capability), it may be the case that the inter-RAT LTE measurement is always performed within measurement gaps. For CSSF scaling when a measurement gap is not used at a UE for inter-RAT LTE measurement, it may be the case that CSSF is only counted for NR carriers and not for LTE carriers, and the LTE PSS/SSS/CRS detection/measurement is performed outside of the NR SSB based measurement timing configuration (SMTC) measurement windows for gapless NR measurement. As another option, when the periodicity of NR SMTC measurement windows for gapless NR measurement is greater than a configured threshold (e.g., "X" ms, where X=5, 20, or any of various other possible values), it may be the case that CSSF is only counted for NR carriers and not for LTE carriers, and the LTE PSS/SSS/CRS detection/measurement is performed outside of the NR SMTC measurement windows for gapless NR measurement, while when the periodicity of NR SMTC measurement windows for gapless NR measurement is equal to or smaller than the configured threshold, it may be the case that CSSF is counted for both NR carriers and LTE carriers, and the LTE PSS/SSS/CRS detection/measurement can be performed inside and outside of the NR SMTC measurement windows for gapless NR measurement.

If the data/control channel of the NR serving cell is different from the target LTE PSS/SSS/CSR subcarrier spacing (SCS) (e.g., 15 kHz) and the UE cannot support mixed numerology, it may be the case that the network puts a scheduling restriction in place to avoid the data/control channel of the NR serving cell colliding with LTE PSS/SSS/CSR symbols, potentially including a margin symbol before and after the LTE PSS/SSS/CSR symbols. Additionally, or alternatively, in such a scenario, the UE may disable or create an interruption to the reception/transmission for the data/control channel of the NR serving cell to prevent colliding with the LTE PSS/SSS/CSR symbols, potentially including a margin symbol before and after the LTE PSS/SSS/CRS symbols. Otherwise, if the UE can support mixed numerology, it may be the case that no such scheduling restriction or interruption is applied.

In a scenario in which an NR serving cell configures a UE to perform inter-RAT measurement on a target non-serving LTE frequency carrier, and the center measurement bandwidth of the target LTE frequency is not within the UE current active BWP, a new UE capability indication may be introduced, which may be referred to as "NeedForGapsInterRAT", "NeedForGapsE-UTRAN", or according to any of various other possible naming conventions. The UE capability indication may indicate whether the UE can perform inter-RAT LTE measurements without measurement gaps if the center measurement bandwidth of the target LTE frequency carrier is not within the UE current active BWP, or possibly regardless of whether the center measurement bandwidth of the target LTE frequency carrier is within the UE current active BWP. The following is one possible example of such a UE capability indication.

```
NeedForGapsBandlistE-UTRAN :: = SEQUENCE (SIZE
(1..maxBands)) OF NeedForGapsE-UTRAN
  NeedForGapsE-UTRAN ::= SEQUENCE {
    bandE-UTRAN              FreqBandIndicatorE-UTRAN,
    gapIndicationInterRAT    ENUMERATED {gap, no-gap}
  }
```

In such a scenario, as in the scenario in which the center measurement bandwidth of the target LTE frequency is within the UE current active BWP, if a UE only supports single carrier capability (e.g., the UE has no CA/DC capability), it may be the case that the inter-RAT LTE measurement is always performed within measurement gaps. For CSSF scaling when a measurement gap is not used at a UE for inter-RAT LTE measurement, it may be the case that CSSF is only counted for NR carriers and not for LTE carriers, and the LTE PSS/SSS/CRS detection/measurement is performed outside of the NR SSB based measurement timing configuration (SMTC) measurement windows for gapless NR measurement. As another option, when the periodicity of NR SMTC measurement windows for gapless NR measurement is greater than a configured threshold (e.g., "X" ms, where X=5, 20, or any of various other possible values), it may be the case that CSSF is only counted for NR carriers and not for LTE carriers, and the LTE PSS/SSS/CRS detection/measurement is performed outside of the NR SMTC measurement windows for gapless NR measurement, while when the periodicity of NR SMTC measurement windows for gapless NR measurement is equal to or smaller than the configured threshold, it may be the case that CSSF is counted for both NR carriers and LTE carriers, and the LTE PSS/SSS/CRS detection/measurement can be performed inside and outside of the NR SMTC measurement windows for gapless NR measurement.

If the data/control channel of the NR serving cell is different from the target LTE PSS/SSS/CSR subcarrier spacing (SCS) (e.g., 15 kHz) and the UE cannot support mixed numerology, it may be the case that the network puts a scheduling restriction in place to avoid the data/control channel of the NR serving cell colliding with LTE PSS/SSS/CSR symbols, potentially including a margin symbol before and after the LTE PSS/SSS/CSR symbols. Additionally, or alternatively, in such a scenario, the UE may disable or create an interruption to the reception/transmission for the data/control channel of the NR serving cell to prevent colliding with the LTE PSS/SSS/CSR symbols, potentially including a margin symbol before and after the LTE PSS/SSS/CRS symbols. Otherwise, if the UE can support mixed numerology, it may be the case that no such scheduling restriction or interruption is applied.

In a scenario in which an LTE serving cell configures a UE to perform inter-RAT measurement on a target non-serving NR frequency carrier, and the center measurement bandwidth of the target NR frequency is within the UE current active BWP, a new UE capability indication may be introduced, which may be referred to as "InterRATMeas-NoGap", "InterRATMeas-NoGap-NR", or according to any of various other possible naming conventions. The UE capability indication may indicate whether the UE can perform inter-RAT NR measurements without measurement gaps if the center measurement bandwidth of the target NR frequency carrier is completely contained in the active BWP of the UE. A new flag indication from the network to the UE may also be introduced, which may be referred to as "InterRATConfig-NoGap", "InterRATConfig-NoGap-NR", or according to any of various other possible naming conventions. If the field is set to true, the UE may be configured to perform inter-RAT LTE measurement without measurement gaps when the NR center measurement bandwidth is completely contained in the active BWP of the UE. Otherwise, it may be the case that the inter-RAT NR measurement is performed within measurement gaps.

Note that, at least according to some embodiments, if a UE only supports single carrier capability (e.g., the UE has no CA/DC capability), it may be the case that the inter-RAT NR measurement is always performed within measurement gaps. For CSSF scaling when a measurement gap is not used at a UE for inter-RAT NR measurement, it may be the case that CSSF is only counted for NR carriers and not for LTE carriers, and LTE PSS/SSS/CRS detection/measurement is performed outside of the NR SMTC measurement windows for gapless NR measurement. As another option, when the periodicity of NR SMTC measurement windows for gapless NR measurement is greater than a configured threshold (e.g., "X" ms, where X=5, 20, or any of various other possible values), it may be the case that CSSF is only counted for NR carriers and not for LTE carriers, and LTE PSS/SSS/CRS detection/measurement is performed outside of the NR SMTC measurement windows for gapless NR measurement, while when the periodicity of NR SMTC measurement windows for gapless NR measurement is equal to or smaller than the configured threshold, it may be the case that CSSF is counted for both NR carriers and LTE carriers, and LTE PSS/SSS/CRS detection/measurement can be performed inside and outside of the NR SMTC measurement windows for gapless NR measurement.

If the data/control channel of the LTE serving cell is different from the target NR SSB or CSI-RS SCS and the UE cannot support mixed numerology, it may be the case that the network puts a scheduling restriction in place to avoid the data/control channel of the LTE serving cell colliding with NR SSB or CSI-RS symbols, potentially including a margin symbol before and after the SSB or CSI-RS symbols. Additionally, or alternatively, in such a scenario, the UE may disable or create an interruption to the reception/transmission for the data/control channel of the LTE serving cell to prevent colliding with the NR SSB or CSI-RS symbols, potentially including a margin symbol before and after the NR SSB or CSI-RS symbols. Otherwise, if the UE can support mixed numerology, it may be the case that no such scheduling restriction or interruption is applied.

In a scenario in which an LTE serving cell configures a UE to perform inter-RAT measurement on a target non-serving NR frequency carrier, and the center measurement bandwidth of the target NR frequency is not within the UE current active BWP, a new UE capability indication may be introduced, which may be referred to as "NeedForGapsInterRAT", "NeedForGapsNR", or according to any of various other possible naming conventions. The UE capability indication may indicate whether the UE can perform inter-RAT NR measurements without measurement gaps if the center measurement bandwidth of the target NR frequency carrier is not within the UE current active BWP, or possibly regardless of whether the center measurement bandwidth of the target NR frequency carrier is within the UE current active BWP. The following is one possible example of such a UE capability indication.

```
NeedForGapsBandlistNR :: = SEQUENCE (SIZE (1..maxBands)) OF
NeedForGapsNR
  NeedForGapsNR ::= SEQUENCE {
    bandNR                    FreqBandIndicatorNR,
    gapIndicationInterRAT     ENUMERATED {gap, no-gap}
  }
```

Note that, at least according to some embodiments, if a UE only supports single carrier capability (e.g., the UE has no CA/DC capability), it may be the case that the inter-RAT NR measurement is always performed within measurement gaps. For CSSF scaling when a measurement gap is not used at a UE for inter-RAT NR measurement, it may be the case that CSSF is only counted for NR carriers and not for LTE carriers, and LTE PSS/SSS/CRS detection/measurement is performed outside of the NR SMTC measurement windows for gapless NR measurement. As another option, when the periodicity of NR SMTC measurement windows for gapless NR measurement is greater than a configured threshold (e.g., "X" ms, where X=5, 20, or any of various other possible values), it may be the case that CSSF is only counted for NR carriers and not for LTE carriers, and LTE PSS/SSS/CRS detection/measurement is performed outside of the NR SMTC measurement windows for gapless NR measurement, while when the periodicity of NR SMTC measurement windows for gapless NR measurement is equal to or smaller than the configured threshold, it may be the case that CSSF is counted for both NR carriers and LTE carriers, and LTE PSS/SSS/CRS detection/measurement can be performed inside and outside of the NR SMTC measurement windows for gapless NR measurement.

If the data/control channel of the LTE serving cell is different from the target NR SSB or CSI-RS SCS and the UE cannot support mixed numerology, it may be the case that the network puts a scheduling restriction in place to avoid the data/control channel of the LTE serving cell colliding with NR SSB or CSI-RS symbols, potentially including a margin symbol before and after the SSB or CSI-RS symbols. Additionally, or alternatively, in such a scenario, the UE may disable or create an interruption to the reception/transmission for the data/control channel of the LTE serving cell to prevent colliding with the NR SSB or CSI-RS symbols, potentially including a margin symbol before and after the NR SSB or CSI-RS symbols. Otherwise, if the UE can support mixed numerology, it may be the case that no such scheduling restriction or interruption is applied.

In the following further exemplary embodiments are provided.

One set of embodiments may include a method, comprising: by a wireless device: establishing a wireless link with a cellular base station according to a first radio access technology (RAT); receiving an indication from the cellular base station to perform at least a first inter-RAT measurement; determining that the wireless device is capable of performing the first inter-RAT measurement without a measurement gap; providing capability information to the cellular base station indicating that the wireless device is capable of performing the first inter-RAT measurement without a measurement gap; and performing the first inter-RAT measurement without a measurement gap.

According to some embodiments, the method further comprises: determining whether the first inter-RAT measurement is within a current active bandwidth part for the wireless device, wherein determining that the wireless device is capable of performing the first inter-RAT measurement without a measurement gap is based at least in part on whether the first inter-RAT measurement is within the current active bandwidth part for the wireless device.

According to some embodiments, the capability information indicates that the wireless device can perform inter-RAT measurements that are within a current active bandwidth part without a measurement gap.

According to some embodiments, the capability information indicates that the wireless device can perform inter-RAT measurements that are outside of a current active bandwidth part without a measurement gap.

According to some embodiments, the capability information indicates, fore respective inter-RAT measurement indicated by the cellular base station, whether the wireless device can perform the respective inter-RAT measurement without a measurement gap.

According to some embodiments, the method further comprises: receiving an indication from the cellular base station to perform the first inter-RAT measurement without a measurement gap.

According to some embodiments, the method further comprises: determining a carrier specific scaling factor (CSSF) based at least in part on the first inter-RAT measurement being performed without a measurement gap.

According to some embodiments, the CSSF is further determined based at least in part on a NR synchronization signal block based measurement timing configuration (SMTC) measurement window periodicity.

According to some embodiments, the method further comprises: determining that the wireless link with the cellular base station and the first inter-RAT measurement are associated with different subcarrier spacing; determining that the wireless device does not support mixed numerology; and disabling communication on the wireless link with the cellular base station while performing the first inter-RAT measurement without a measurement gap based at least in part on the wireless link with the cellular base station and the first inter-RAT measurement being associated with different subcarrier spacing and the wireless device not supporting mixed numerology.

According to some embodiments, the first RAT is LTE, wherein the first inter-RAT measurement is a NR measurement.

According to some embodiments, first RAT is NR, wherein the first inter-RAT measurement is a LTE measurement.

Another set of embodiments may include a wireless device, comprising: one or more processors; and a memory having instructions stored thereon, which when executed by the one or more processors, perform steps of the method of any of the preceding examples.

Yet another set of embodiments may include a computer program product, comprising computer instructions which, when executed by one or more processors, perform steps of the method of any of the preceding examples.

Still another set of embodiments may include a method, comprising: by a cellular base station: establishing a wireless link with a wireless device according to a first radio access technology (RAT); providing an indication to the wireless device to perform at least a first inter-RAT measurement; and receiving capability information from the wireless device indicating that the wireless device is capable of performing the first inter-RAT measurement without a measurement gap.

According to some embodiments, the capability information indicates one or more of: the wireless device can perform inter-RAT measurements that are within a current active bandwidth part without a measurement gap; the wireless device can perform inter-RAT measurements that are outside of the current active bandwidth part without a measurement gap; or the wireless device can perform inter-RAT measurements without a measurement gap regardless of whether the inter-RAT measurements are within the current active bandwidth part or outside of the current active bandwidth part.

According to some embodiments, the capability information indicates, for each respective inter-RAT measurement indicated by the cellular base station, whether the wireless device can perform the respective inter-RAT measurement without a measurement gap.

According to some embodiments, the method further comprises: providing an indication to the wireless device to perform the first inter-RAT measurement without a measurement gap.

According to some embodiments, the method further comprises: determining that the wireless link with the cellular base station and the first inter-RAT measurement are associated with different subcarrier spacing; determining that the wireless device does not support mixed numerology; and restricting scheduling communication on the wireless link with the wireless device during the first inter-RAT measurement based at least in part on the wireless link with the wireless device and the first inter-RAT measurement being associated with different subcarrier spacing and the wireless device not supporting mixed numerology.

A further set of embodiments may include a cellular base station, comprising: one or more processors; and a memory having instructions stored thereon, which when executed by the one or more processors, perform steps of the method of any of the preceding examples.

A still further set of embodiments may include a computer program product, comprising computer instructions which, when executed by one or more processors, perform steps of the method of any of the preceding examples.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:

by a wireless device:

establishing a wireless link with a cellular base station according to a first radio access technology (RAT);

receiving an indication from the cellular base station to perform at least a first inter-RAT measurement;

determining that the wireless device is capable of performing the first inter-RAT measurement without a measurement gap;

determining that one or more of data or control communication on the wireless link with the cellular base station and the first inter-RAT measurement are associated with different subcarrier spacing;

determining that the wireless device does not support mixed numerology;

interrupting one or more of data or control communication on the wireless link with the cellular base station while performing the first inter-RAT measurement without a measurement gap based at least in part on one or more of data or control communication on the wireless link with the cellular base station and the first inter-RAT measurement being associated with different subcarrier spacing and the wireless device not supporting mixed numerology; and performing the first inter-RAT measurement without a measurement gap.

2. The method of claim 1, wherein the method further comprises:

determining whether a measurement frequency associated with the first inter-RAT measurement is within a current active bandwidth part for the wireless device, wherein determining that the wireless device is capable of performing the first inter-RAT measurement without a measurement gap is based at least in part on whether the measurement frequency associated with the first inter-RAT measurement is within the current active bandwidth part for the wireless device.

3. The method of claim 1, wherein the capability information indicates that the wireless device is capable of performing inter-RAT measurements associated with one or more measurement frequencies that are within a current active bandwidth part without a measurement gap.

4. The method of claim 1, wherein the capability information indicates that the wireless device is capable of performing inter-RAT measurements associated with one or more measurement frequencies that are outside of all active bandwidth parts without a measurement gap.

5. The method of claim 1, wherein the capability information indicates that the wireless device is capable of performing inter-RAT measurements without a measurement gap regardless of whether measurement frequencies associated with the inter-RAT measurements are inside or outside of a current active bandwidth part.

6. The method of claim 1, wherein the capability information indicates, for each respective inter-RAT measurement indicated by the cellular base station, whether the wireless device is capable of performing the respective inter-RAT measurement without a measurement gap.

7. The method of claim 1, wherein the method further comprises:

receiving an indication from the cellular base station to perform the first inter-RAT measurement without a measurement gap.

8. The method of claim 1, wherein the method further comprises:

determining a carrier specific scaling factor (CSSF) based at least in part on the first inter-RAT measurement being performed without a measurement gap, wherein the CSSF is further determined based at least in part on a NR synchronization signal block based measurement timing configuration (SMTC) measurement window periodicity.

9. The method of claim 1, wherein the first RAT is LTE, wherein the first inter-RAT measurement is a NR measurement.

10. The method of claim 1, wherein the first RAT is NR, wherein the first inter-RAT measurement is a LTE measurement.

11. The method of claim 1, further comprising:

providing, during one of a wireless link establishment, an initial configuration, or in response to a configuration, capability information to the cellular base station indicating that the wireless device is capable of performing the first inter-RAT measurement without a measurement gap.

12. A method, comprising:

establishing a wireless link with a wireless device according to a first radio access technology (RAT);

providing an indication to the wireless device to perform at least a first inter-RAT measurement;

determining that one or more of data or control communication on the wireless link with the cellular base station and the first inter-RAT measurement are associated with different subcarrier spacing;

determining that the wireless device does not support mixed numerology; and restricting one or more of data or control communication on the wireless link with the wireless device during the first inter-RAT measurement based at least in part on one or more of data or control communication on the wireless link with the wireless device and the first inter-RAT measurement being associated with different subcarrier spacing and the wireless device not supporting mixed numerology.

13. The method of claim 12, further comprising:

receiving, during one of a wireless link establishment, an initial configuration or in response to a configuration, capability information from the wireless device indicating that the wireless device is capable of performing the first inter-RAT measurements without a measurement gap.

14. The method of claim 13, wherein the capability information indicates one or more of:

the wireless device is capable of performing inter-RAT measurements associated with measurement frequencies that are within a current active bandwidth part without a measurement gap;

the wireless device is capable of performing inter-RAT measurements associated with measurement frequencies that are outside of all active bandwidth parts without a measurement gap; or the wireless device is capable of performing inter-RAT measurements without a measurement gap regardless of whether the inter-RAT measurements associated with measurement frequencies are within the current active bandwidth part or outside of all active bandwidth parts.

15. The method of claim 13, wherein the capability information indicates whether the wireless device is capable of performing the respective inter-RAT measurement without a measurement gap.

16. The method of claim 15, further comprising:

providing an indication to the wireless device to perform the first inter-RAT measurement without a measurement gap.

17. An apparatus, comprising:

a processor configured to, when executing instructions stored in a memory, perform operations comprising:

establishing a wireless link with a wireless device according to a first radio access technology (RAT);

providing an indication to the wireless device to perform at least a first inter-RAT measurement;

determining that one or more of data or control communication on the wireless link with the cellular base station and the first inter-RAT measurement are associated with different subcarrier spacing;

determining that the wireless device does not support mixed numerology; and restricting one or more of data or control communication on the wireless link with the wireless device during the first inter-RAT measurement based at least in part on one or more of data or control communication on the wireless link with the wireless device and the first inter-RAT measurement being associated with different subcarrier spacing and the wireless device not supporting mixed numerology.

18. The apparatus of claim 17, wherein the operations further comprise:

receiving, during one of a wireless link establishment, an initial configuration or in response to a configuration, capability information from the wireless device indicating that the wireless device is capable of performing the first inter-RAT measurements without a measurement gap.

19. The apparatus of claim 18, wherein the capability information indicates one or more of:

the wireless device is capable of performing inter-RAT measurements associated with measurement frequencies that are within a current active bandwidth part without a measurement gap;

the wireless device is capable of performing inter-RAT measurements associated with measurement frequencies that are outside of all active bandwidth parts without a measurement gap; or the wireless device is capable of performing inter-RAT measurements without a measurement gap regardless of whether the inter-RAT measurements associated with measurement frequencies are within the current active bandwidth part or outside of all active bandwidth parts.

20. The apparatus of claim 18, wherein the capability information indicates whether the wireless device is capable of performing the respective inter-RAT measurement without a measurement gap.

* * * * *